(12) United States Patent  
Hanna

(10) Patent No.: US 8,306,279 B2  
(45) Date of Patent: Nov. 6, 2012

(54) OPERATOR INTERFACE FOR FACE AND IRIS RECOGNITION DEVICES

(75) Inventor: Keith J. Hanna, New York, NY (US)

(73) Assignee: Eyelock, Inc., Caguas, PR (US)

( * ) Notice: Subject to any disclaimer, the term of this patent is extended or adjusted under 35 U.S.C. 154(b) by 460 days.

(21) Appl. No.: 12/559,908

(22) Filed: Sep. 15, 2009

(65) Prior Publication Data

US 2011/0002510 A1    Jan. 6, 2011

Related U.S. Application Data

(60) Provisional application No. 61/097,012, filed on Sep. 15, 2008.

(51) Int. Cl.
G06K 9/00 (2006.01)
G06K 9/22 (2006.01)

(52) U.S. Cl. ......................................... 382/117; 382/313

(58) Field of Classification Search ........................ None
See application file for complete search history.

(56) References Cited

U.S. PATENT DOCUMENTS 4,641,349 A    2/1987    Flom et al.
(Continued)

FOREIGN PATENT DOCUMENTS

GB          2252836    *    8/1992

OTHER PUBLICATIONS

B. Galvin, et al., Recovering Motion Fields: An Evaluation of Eight Optical Flow Algorithms, Proc. of the British Machine Vision Conf. (1998).

(Continued)

*Primary Examiner* — Jason M Repko
*Assistant Examiner* — David F Dunphy
(74) *Attorney, Agent, or Firm* — John D. Lanza; Foley and Lardner LLP

(57)    ABSTRACT

A primarily hand-held or adjustable-mount iris recognition device wherein feedback to the operator is provided by visible illumination or imagery projected onto the face of the subject, as well as an audio signal, while infra-red illumination is projected onto the face of the subject as an illumination source for an iris recognition process. When the device is pointed in the direction of the subject, the infra-red illumination is directed to illuminate primarily the eye region whereas the visible illumination is directed to illuminate primarily other regions including the cheeks. The visible illumination is configured such that the position of the visible illumination on the face indicates to the operator whether the iris recognition device is pointed in the correct direction and at the correct distance for optimal iris recognition. The brightness of the visible illumination is modified in response to the result of an eye detection process performed on the iris recognition device, and the brightness, color and other attributes of the visible illumination or the audio signal are modified in response to the result of eye-finding or other process, including the results of an iris recognition process.

20 Claims, 16 Drawing Sheets

U.S. PATENT DOCUMENTS

| | | | |
|---|---|---|---|
| 4,887,286 A * | 12/1989 | Seidenberg | 378/170 |
| 4,989,968 A * | 2/1991 | Freedman | 351/206 |
| 5,259,040 A | 11/1993 | Hanna | |
| 5,488,675 A | 1/1996 | Hanna | |
| 5,572,596 A | 11/1996 | Wildes et al. | |
| 5,581,629 A | 12/1996 | Hanna et al. | |
| 6,247,813 B1 | 6/2001 | Kim et al. | |
| 6,714,665 B1 | 3/2004 | Hanna et al. | |
| 6,760,467 B1 | 7/2004 | Min et al. | |
| 7,801,335 B2 | 9/2010 | Hanna et al. | |
| 2006/0249679 A1 * | 11/2006 | Johnson et al. | 250/332 |
| 2008/0232788 A1 * | 9/2008 | Piersol et al. | 396/50 |
| 2010/0021017 A1 * | 1/2010 | Bell et al. | 382/117 |
| 2010/0110275 A1 * | 5/2010 | Mathieu | 348/360 |
| 2010/0128839 A1 * | 5/2010 | Partain et al. | 378/4 |
| 2010/0188243 A1 * | 7/2010 | Tysowski et al. | 340/669 |
| 2010/0254554 A1 * | 10/2010 | Fusakawa et al. | 381/315 |

OTHER PUBLICATIONS

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

Notice of Allowance on U.S. Appl. No. 11/559,381 dated May 18, 2010.

R. Kumar, et al., Direct recovery of shape from multiple views: a parallax based approach, 12th IAPR Int'l Conf. on Pattern Recognition, (1994).

R. P. Wildes, Iris Recognition: An Emerging Biometric Technology, Proc. IEEE 85(9) at pp. 1348-1363 (Sep. 1997).

* cited by examiner

OPERATOR INTERFACE FOR FACE AND IRIS RECOGNITION DEVICES

CROSS-REFERENCE TO RELATED APPLICATIONS

This application claims priority from U.S. Provisional Application 61/097,012, filed Sep. 15, 2008, which is hereby incorporated by reference.

BACKGROUND OF THE INVENTION

In devices for face and iris recognition, particularly in handheld units that are controlled by an operator, there is typically a means to point the unit at the correct distance and orientation with respect to the subject.

FIG. 1 shows an example of an existing iris recognition device 100 that has an operator graphical user interface (GUI) or a set of indicating lights 101. For example, the operator GUI may contain red or green lights to indicate that the subject is too far or too close, or it may contain a screen that displays imagery acquired by the iris recognition device.

A key problem is that the operator 103 has to look away from the subject 102 and instead look at the GUI or indicating lights on the device. This is indicated in FIG. 1 wherein the gaze of the operator is diverted from the face of the subject. In many applications however, it is much preferred that the operator continues to look at the subject and not the GUI or indicator lights on the device. For example, in applications requiring high person-throughput, the operator has to first direct their attention at a subject's face which is typically required in the process of interacting with them, and then has to re-direct their gaze to the GUI or set of indicating lights on the device. Further, the operator has to repeat this gaze re-direction many hundreds of times per hour. Such shift in gaze can be distracting to both the operator and the subject, and increases the time it takes for the operator to use the face or iris recognition device.

The invention is a novel operator interface that allows the operator to continue looking at the subject while the face or iris recognition device is operating.

SUMMARY OF THE INVENTION

Visible illumination or imagery is projected onto the face of the subject and an audio signal is provided as a means to provide feedback for the operator, while infra-red illumination is projected onto the face of the subject as an illumination source for iris recognition. When the device is pointed in the direction of the subject, the infra-red illumination is directed to illuminate primarily the eye region whereas the visible illumination is directed to illuminate primarily other regions including the cheeks in order to avoid causing visual distraction or discomfort to the eyes of the subject. The visible illumination is directed such that the position of the visible illumination on the face indicates to the operator whether the iris recognition device is pointed in the correct direction and at the correct distance for optimal iris recognition. In one embodiment, visible illumination is directed under the eye on the left cheek and under the eye on the right cheek to indicate that the operator has the iris recognition device at the correct distance and at the correct orientation for optimal iris recognition. In one embodiment, feedback is also provided to the operator using an audible signal indicates that the iris recognition device at the correct distance and at the correct orientation for optimal iris recognition. The brightness of the visible illumination is modified in response to the result of an eye detection process performed on the iris recognition device in order to reduce or turn off the visible illumination if the operator points the iris recognition device such that the position of the visible illumination on the face of the subject is at or close to one of the eyes of the subject, in order to reduce or eliminate discomfort to the eyes of the subject arising from the visible illumination. The brightness, color and other attributes of the visible illumination are modified in response to the result of the iris recognition process in order to indicate to the operator the results of the iris recognition process without having to substantially divert their gaze from the subject.

DESCRIPTION OF THE PREFERRED EMBODIMENT

Figure 1:
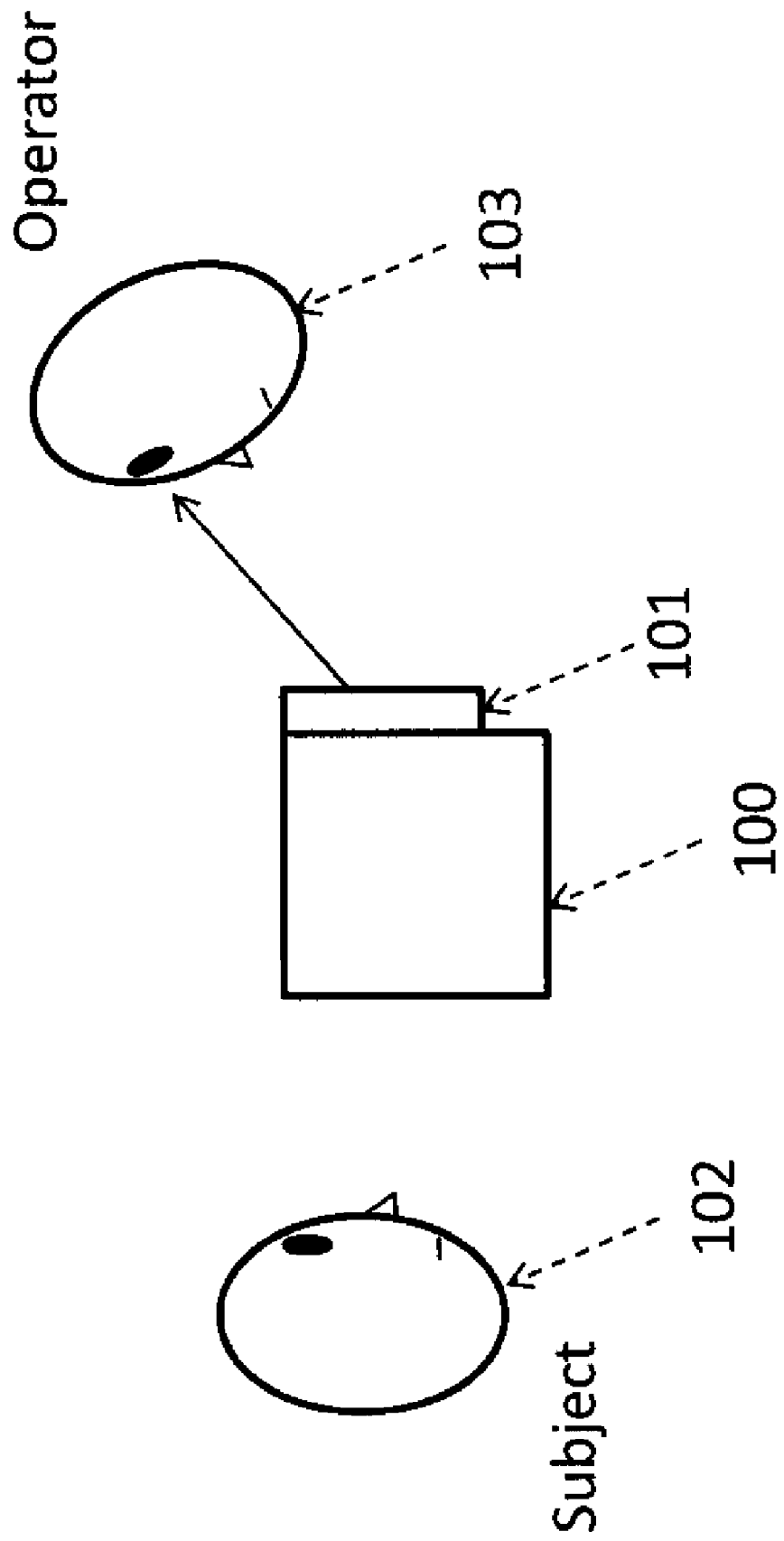
FIG. 1 shows an existing iris recognition system wherein the gaze of the operator is fixated on the iris recognition system and not on the subject
Figure 2:
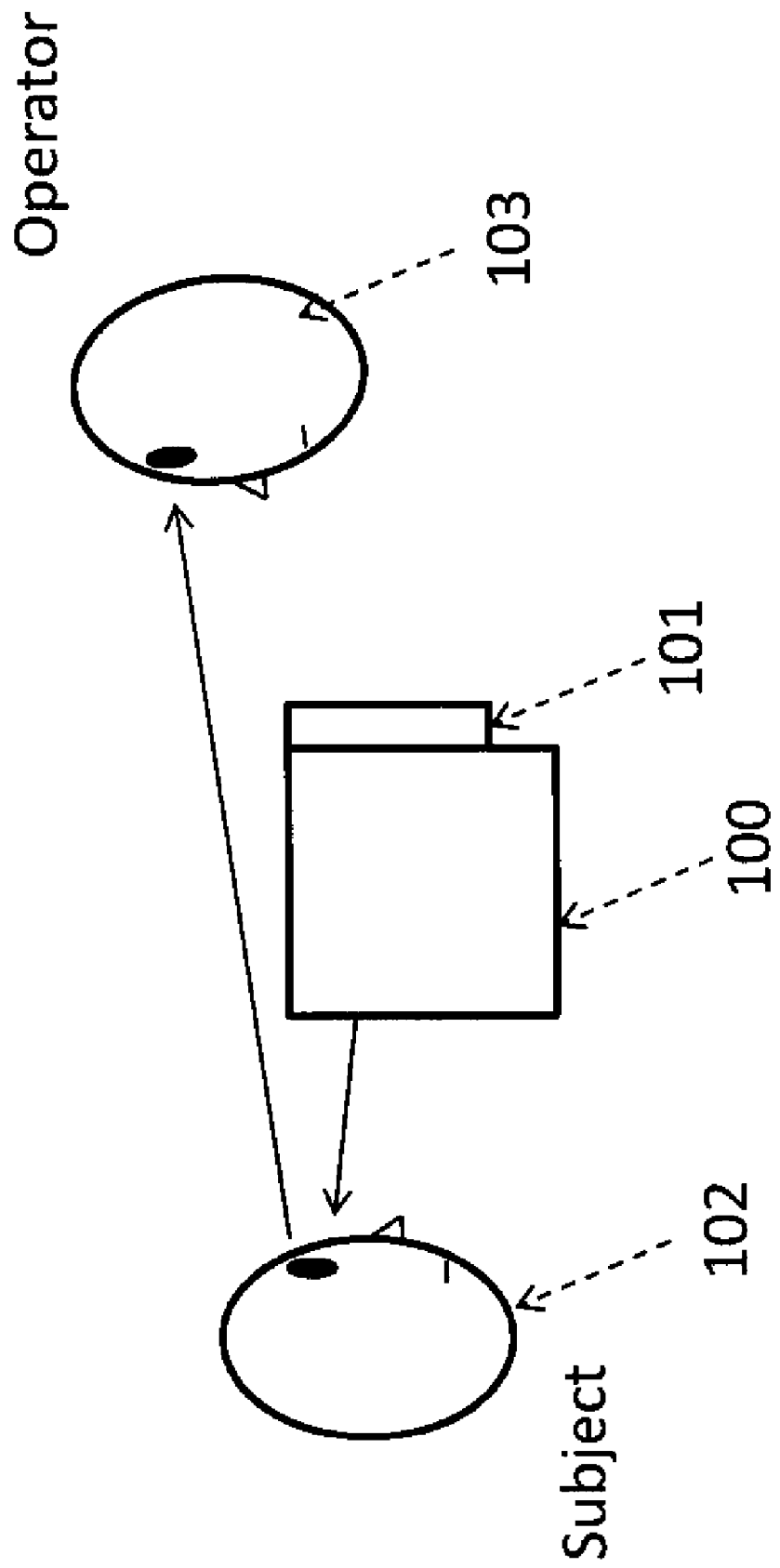
FIG. 2 shows an embodiment of the invention wherein the gaze of the operator is fixated on the face of the subject while iris recognition is being performed

The first element in the invention is shown in FIG. 2 wherein visible illumination from the iris recognition device 100 is projected onto the face of the subject 102. The operator can then look at the subject but at the same time can look at the illumination projected onto the subject's face, without having to re-direct their gaze to any user feedback display or illuminators 101 mounted on the iris recognition device.

Figure 3:
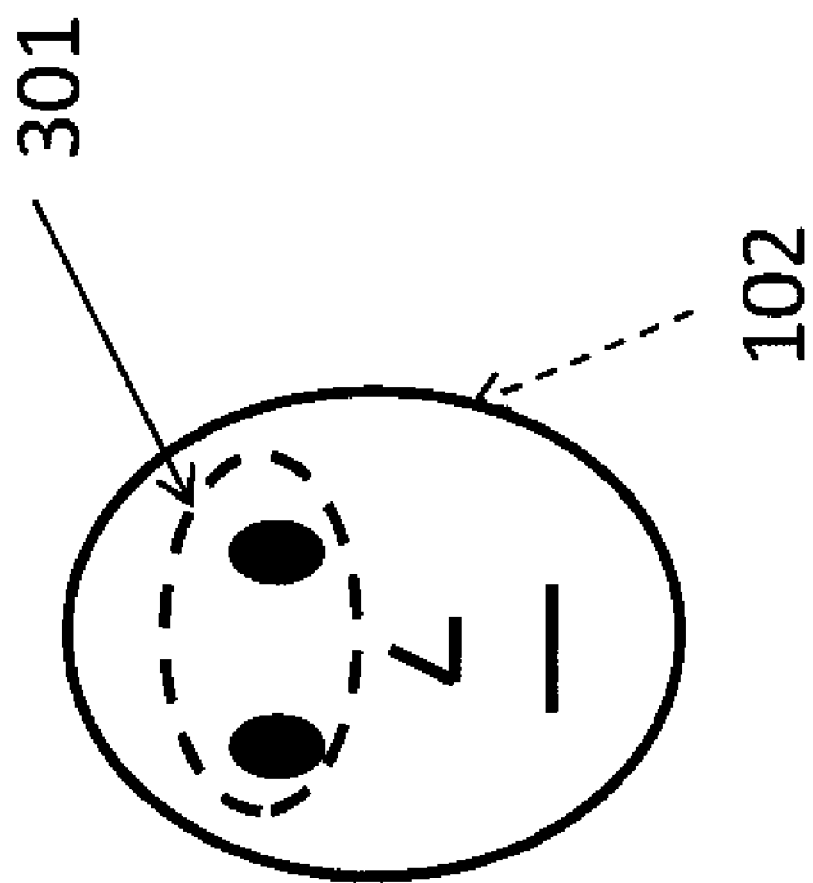
FIG. 3 shows visible illumination being projected onto the face of the subject
Figure 4:
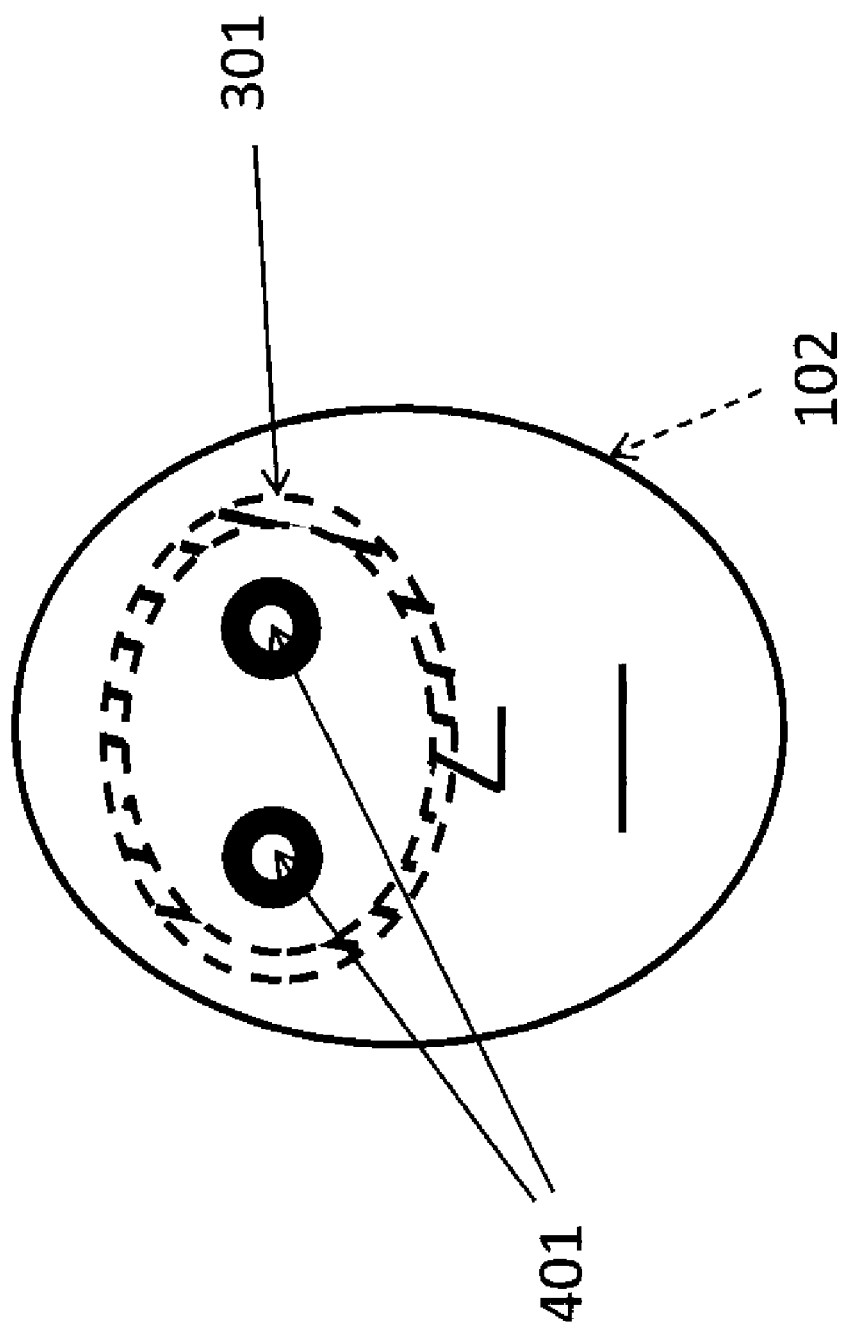
FIG. 4 shows an expanded view of FIG. 3, indicating that the visible illumination used for operator feedback is projected onto the face such that it primarily avoids the eye regions

FIG. 3 shows how visible illumination 301 is projected onto a portion of the face of the subject 102. However, the visible illumination may be sufficiently bright to the eyes of the subject that it may be distracting or uncomfortable. FIG. 4 is an expanded view of FIG. 3, and shows how the visible illumination is projected onto a small strip 301 around the eye region but does not include the pupils 401 of the eyes themselves in order to avoid discomfort to the subject. The visible illumination can be projected onto other non-eye regions of the face, such as the cheeks, mouth or forehead as discussed later in this specification.

Figure 5:
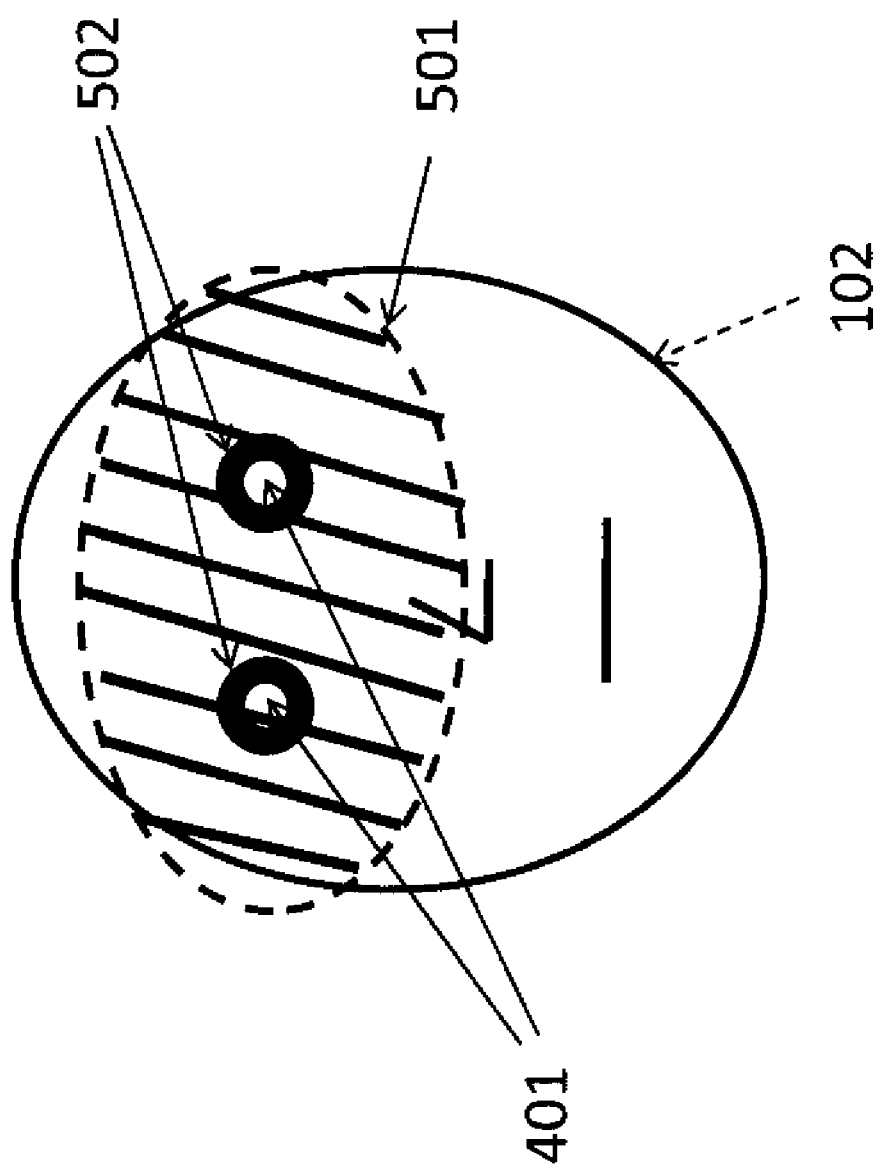
FIG. 5 shows that the infra-red illumination used for iris recognition is projected onto the face such that it primarily includes the eye regions

FIG. 5 shows infra-red illumination 501 projected from the device onto the eye region. It is well-known in the field of iris recognition that a preferred illumination for the purposes of iris recognition lies within the infra-red band, as discussed by Daugman in U.S. Pat. No. 5,291,560. The invention disclosed herein is such that the region of the face that is illuminated by infra-red illumination is larger than the region illuminated by the visible illumination. This is so that the operator need not precisely point the device in order to ensure that infra-red illumination illuminates the irises 502 of the eyes, but at the same time the visible illumination provides more precise feedback of where the operator ought to be pointing the device, so that if iris recognition is failing because the device is not pointed sufficiently closely towards the eyes of the subject, the operator has more precise feedback via the visible illumination in order to refine the pointing orientation of the device.

Figure 6:
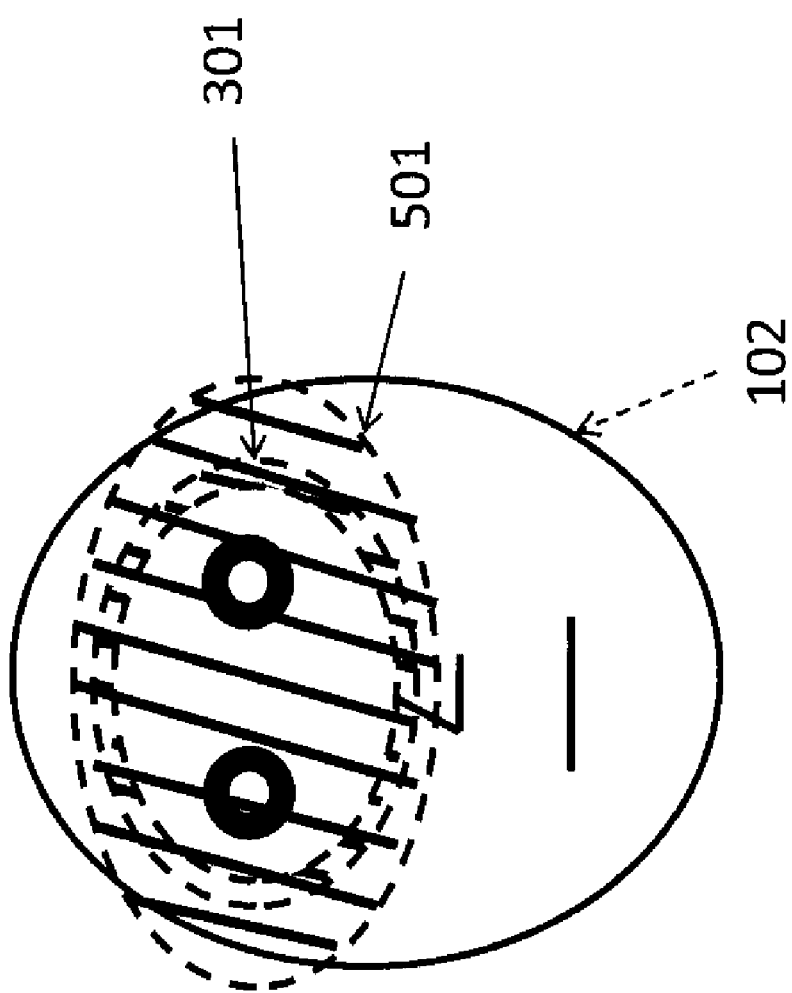
FIG. 6 shows both the visible illumination and infra-red illumination being projected together onto the face of the subject

FIG. 6 shows both the infra-red illumination 501 and the visible illumination 301 projected from the iris recognition device. We control the direction of the visible illumination such when the infra-red illumination is substantially illuminating the eye regions, then the visible illumination is substantially illuminating one or more of the other face regions and not the eye region, in order to avoid discomfort of the subject 102 from bright light shining in their eyes.

Figure 7:
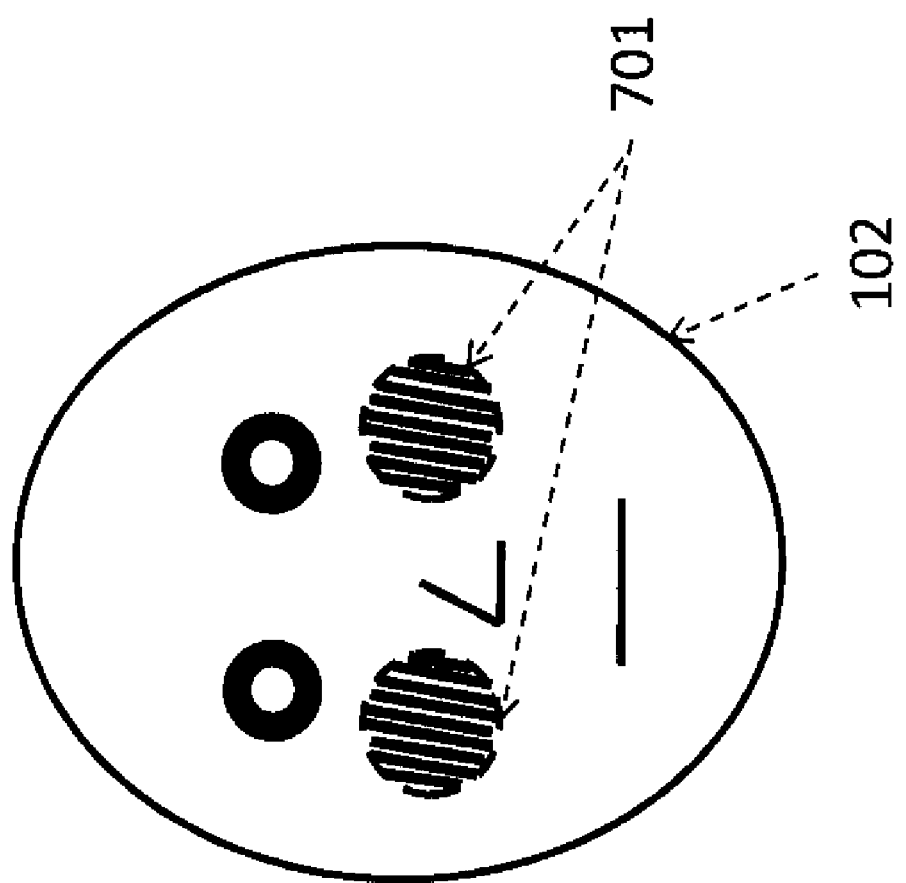
FIG. 7 shows an embodiment of the invention wherein the visible illumination is projected beneath each eye on the left and right cheeks respectively at an optimal distance for iris recognition, as indicated to the operator by the visible illumination being positioned on the cheeks directly under the eyes

FIG. 7 shows a second preferred location for the projection of the visible illumination on the face. The visible illumination 701 is projected onto the left and right cheeks beneath the eyes. The cheek areas are close to the eyes so that the gaze of the operator is minimally diverted between the two stages of (i) interacting (usually verbally) with the subject and (ii) using the device to perform the face or iris recognition process. The cheek areas also present substantially flat regions onto which visible illumination can be clearly projected. Finally, the existence of a left and right cheek allows for illumination to be projected onto each cheek, making any asymmetry in the reflected illumination, caused by incorrect pointing by the operator, to be apparent thereby allowing the operator to adjust the pointing orientation with respect to the subject.

Figure 8:
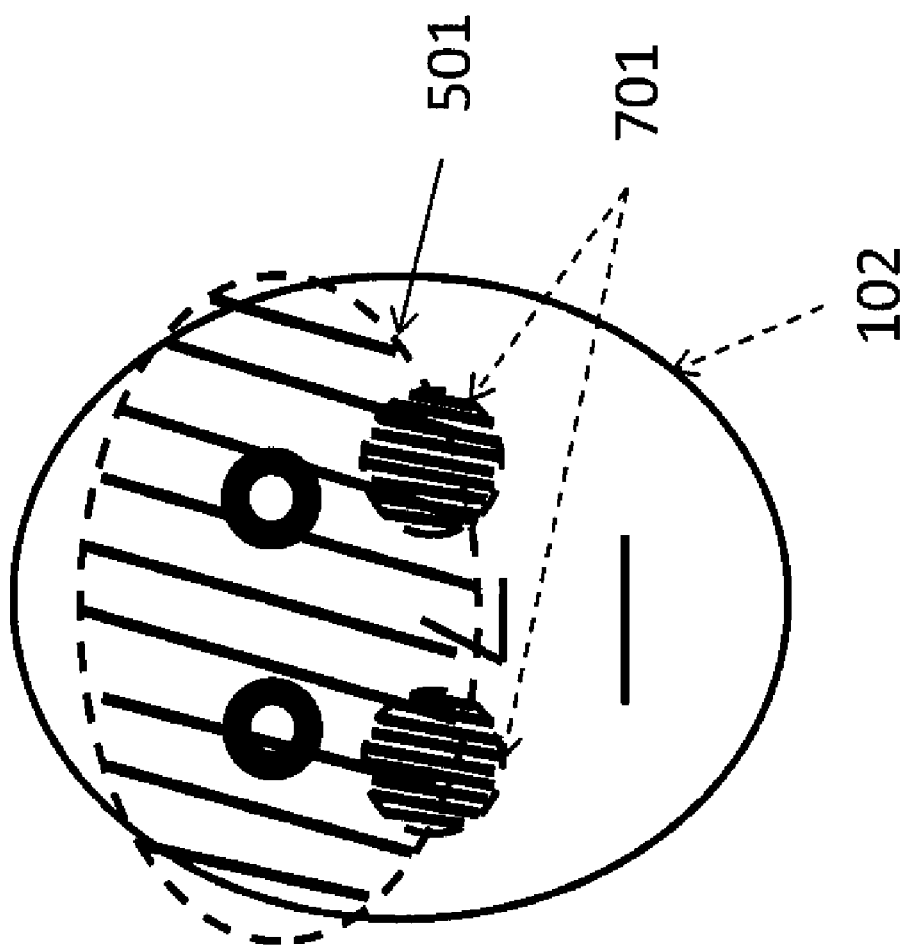
FIG. 8 shows both the visible illumination indicated in FIG. 7 and the infra-red illumination being projected together onto the face of the subject

Similarly to FIG. 6, FIG. 8 shows the infra-red illumination 501 and visible illumination 701 together in the case where the visible illumination is projected onto the cheeks. Other face portions onto which the visible illumination can be projected include the forehead and the mouth region.

Figure 9:
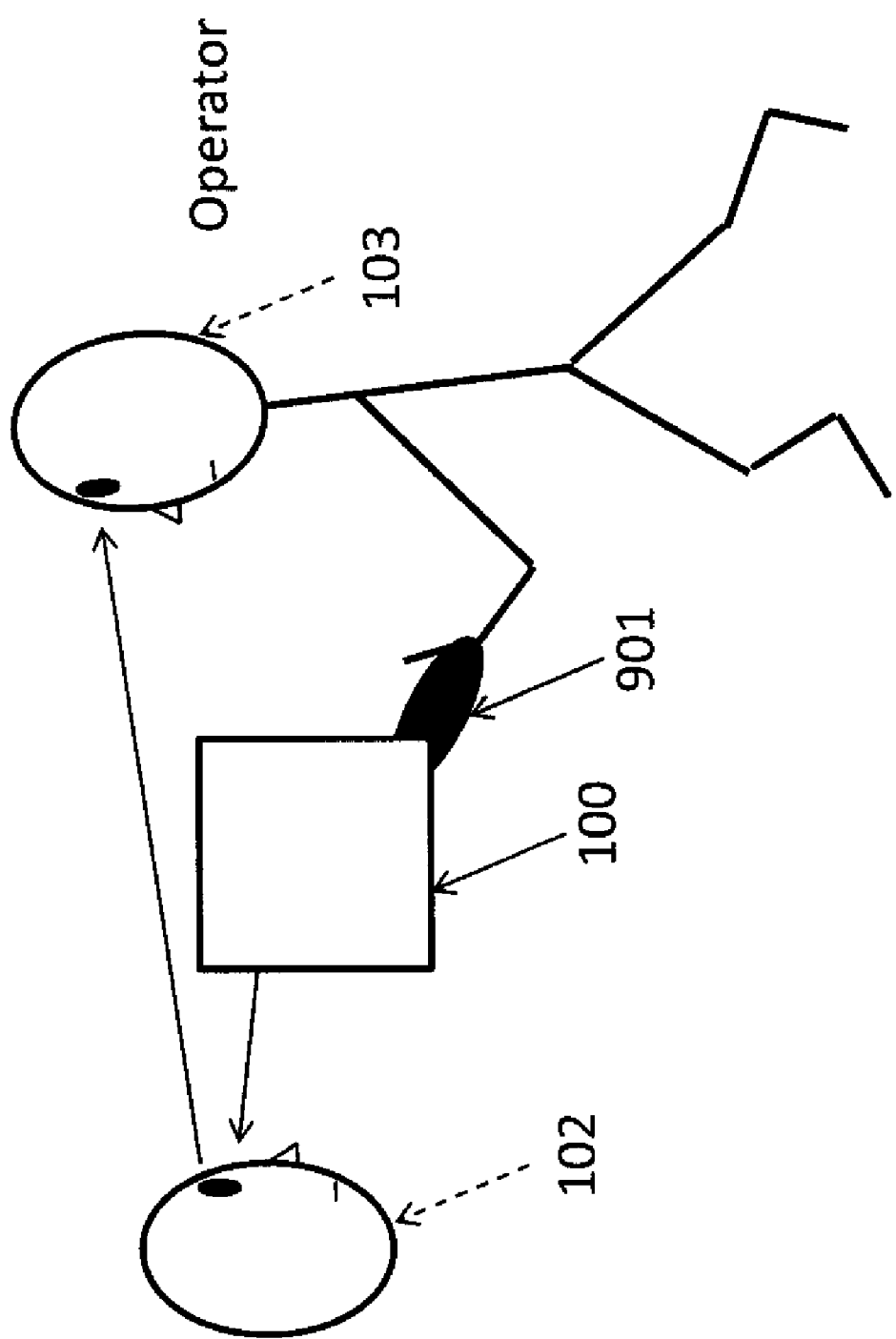
FIG. 9 shows an embodiment of the invention wherein the operator observes the visual illumination on the face of the subject, uses the position or other attributes of the visual illumination on the face of the subject to re-point the iris recognition device for optimal iris recognition using a handle attached to the iris recognition device, and then uses additional attributes of the visual illumination on the face of the subject in order to determine the result of the iris recognition process

FIG. 9 shows how the operator uses the system. The operator 102 holds the device by a handle 901 and uses the visible illumination projected onto the subject 102 to point the device such that the visible illumination appears in the correct location in the face.

Figure 10:
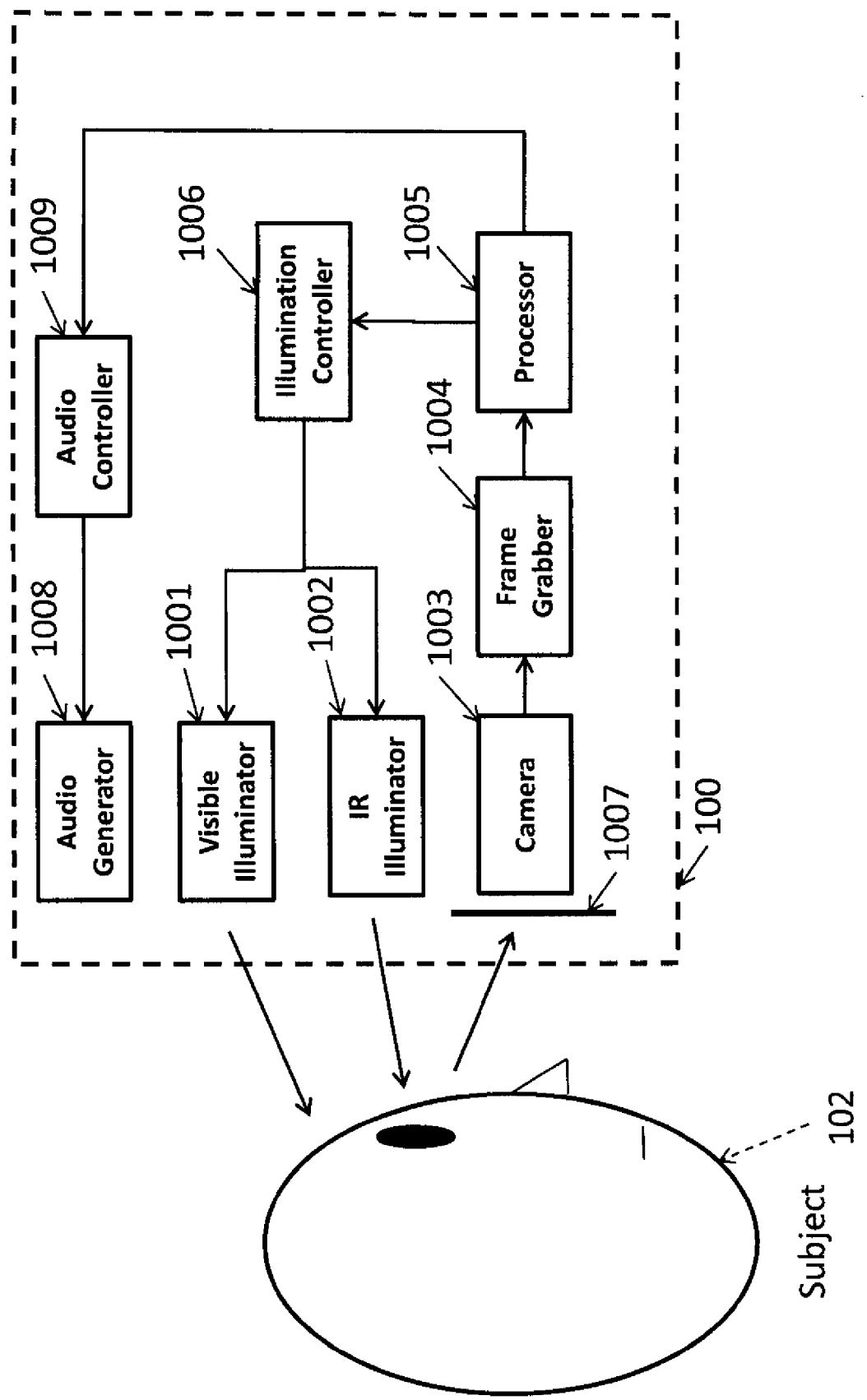
FIG. 10 shows the components in an embodiment of the invention

FIG. 10 shows the components within the system 100. The visible illuminator 1001 and the infra-red illuminator 1002 are controlled by an illumination controller 1006. A camera and lens 1003 captures imagery of the face of the subject 102. A visible-cut filter 1007 blocks visible light from the visible illuminator reflected off the face of the subject but allows the infra-red illumination used for iris recognition to pass. A frame grabber 1004 acquires frames from the camera and a processor 1005 performs processing responsive to the acquired imagery, including eye finding and iris recognition. For example, Daugman in U.S. Pat. No. 5,291,560 provides examples of methods for performing eye finding and iris recognition. The result of the processing is fed to the illumination controller 1006 in order to control the visible illumination in different ways as described later in the specification. The result of the processing is also fed to an optional audio controller 1009 and then to an audio signal generator 1008.

Figure 11:
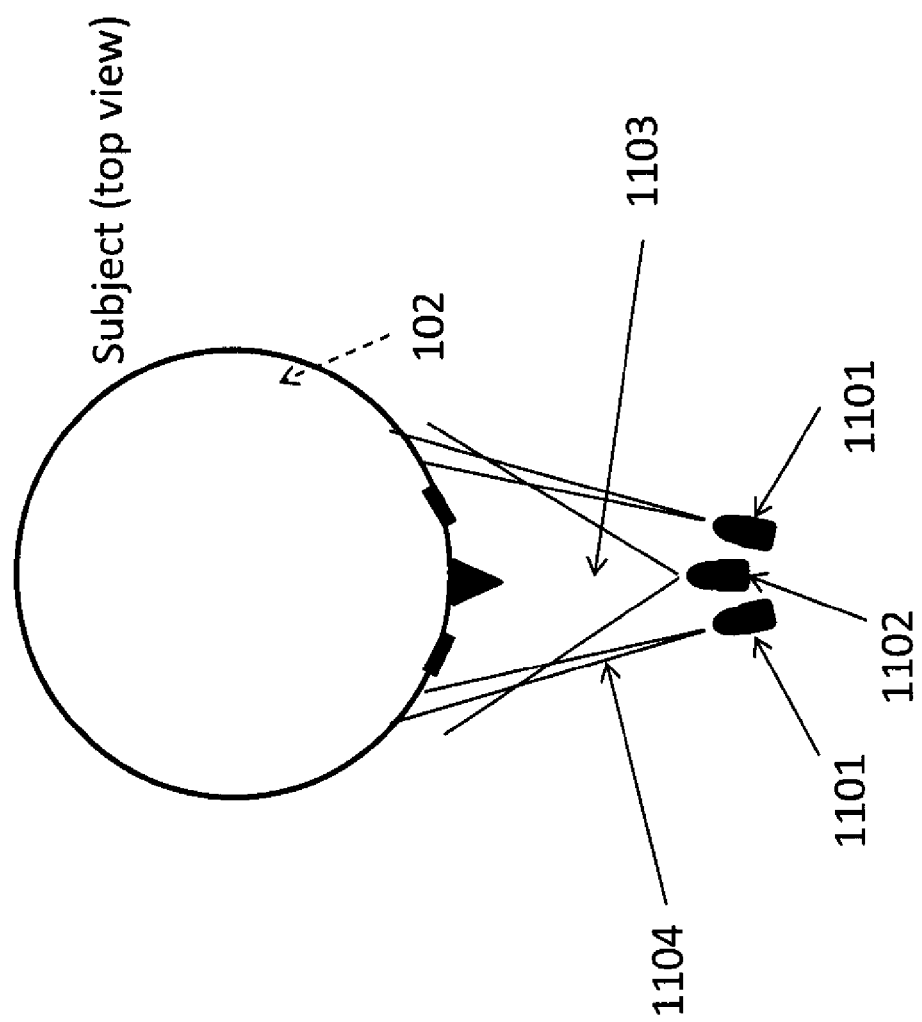
FIG. 11 shows the pointing angles and position of the visible and infra-red illumination within the iris recognition device, in one embodiment of the invention
Figure 12:
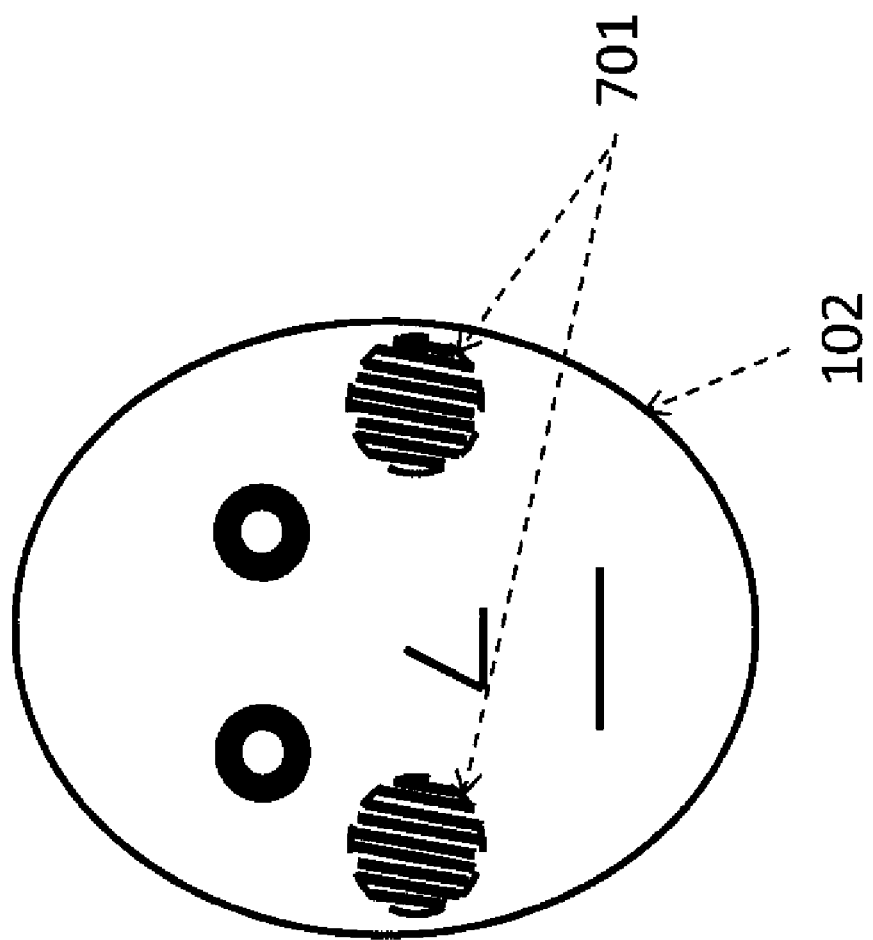
FIG. 12 shows the embodiment of the invention indicated in FIG. 7, except the iris recognition device is positioned by the operator at a distance from the subject that is sub-optimal (too far) for iris recognition, as indicated by the visible illumination not being positioned on the cheeks under the eyes but being positioned further apart

FIG. 11 shows a preferred method for projecting the visible and infra-red illumination onto the face of the subject 102. As described earlier, the infra-red illuminator 1102 has a wider field of view 1103 in at least one direction compared to the one or more visible illuminators 1101 which have a smaller field of view 1104 in at least one direction compared to that of the infra-red illuminator. The illumination for the infra-red illumination is provided by Light Emitting Diodes (LEDs) coupled with lenses or optical diffusers mounted within or near the body of the LEDs to ensure a wide field of view illumination coverage. The visible illumination can be provided by a variety of means. It can be provided by LEDs that have a smaller field of view compared to that of the infra-red illuminators, or it can be provided by laser diodes that have illumination with a very small field of view, or it can be an image projected by a compact video projector. The visible and infra-red illuminators are positioned in the device such that when the infra-red illumination is illuminating the eye region, the visible illumination is illuminating the cheeks, or other chosen non-eye region as discussed previously. This is achieved by mounting the infra-red and visible illuminators at different angles within the device, such that they are pointing at the eye and non-eye regions respectively at the optimal operating distance of the iris recognition device. For example, two visible illuminators can be used such they are located near the middle of the device each pointing to one side or cheek of the face at the operating distance of the device as shown in FIG. 11. As the operator moves the device further from the face of the subject, then the reflections of the illuminators 701 observed by the operator on the face move further apart as shown in FIG. 12 since the visible illumination is projected at a greater distance from the device while the angle between the two visible illuminators remains the same.

Figure 13:
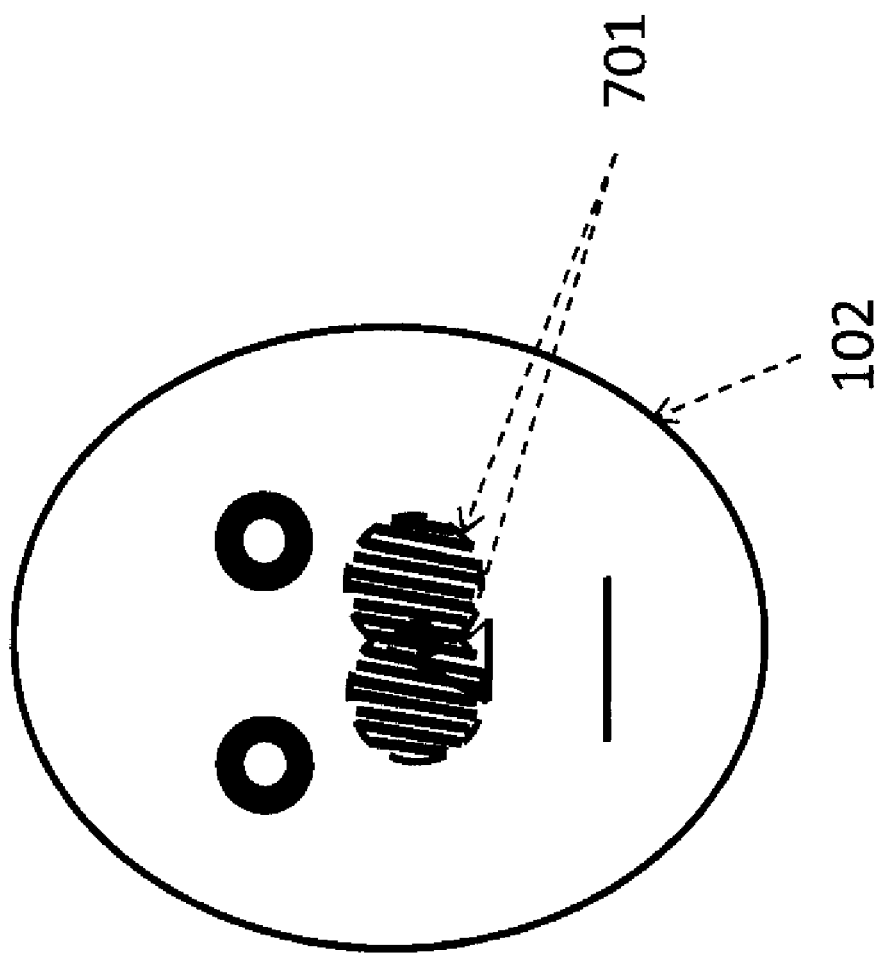
FIG. 13 shows the embodiment of the invention indicated in FIG. 7, except the iris recognition device is positioned by the operator at a distance from the subject that is sub-optimal (too close) for iris recognition, as indicated by the visible illumination not being positioned on the cheeks under the eyes but being positioned closer together

Conversely, if the operator moves the device closer to the subject than the operating distance, then the reflections of the illuminators move closer together as shown in FIG. 13. It is fairly straightforward for an operator to position the device such that the visible illumination is approximately on each cheek directly below each eye. Since eye separation is similar across subjects, then this method can be used by the operator as an approximate distance feedback mechanism to ensure the device is not too close or far from the subject for reliable operation of the iris recognition device. This variation with subject-distance in the illumination separation is enabled by an angle between the two visible illuminators such that a change in distance results in a change in observed separation of the reflected light of the illuminators. For example, at an optimal operating distance of 24" for an iris recognition device, and a cheek separation of approximately 3", then the horizontal distance from the centerline of the device to each cheek is 3"/2=1.5", and each illuminator is then angled at a Tan(1.5"/24")=3.6 degrees from the centerline of the device. The visible illuminators are therefore angled at 3.6 degrees× 2=7.2 degrees from each other. A method for increasing the magnitude of the displacement of the reflections of the visible illuminators as the distance from the subject changes is to increase the angle between the illuminators while still directing the illumination to strike the face of the subject. This is achieved by mounting the illuminators towards the sides of the iris recognition device such that an illuminator mounted on the left of the device is directed towards the right cheek, and such that an illuminator mounted on the right of the device is directed towards the left cheek.

In an alternate embodiment, the size or extent of the visible illumination gives an indication of the distance of the iris recognition device from the subject. For example, if the visible illumination is projected with a lens mechanism with a fixed field of view, then as the device is brought closer to the subject, the area illuminated on the face will reduce. Conversely, as the device is brought further from the subject, the area illuminated on the face will increase.

Figure 14:
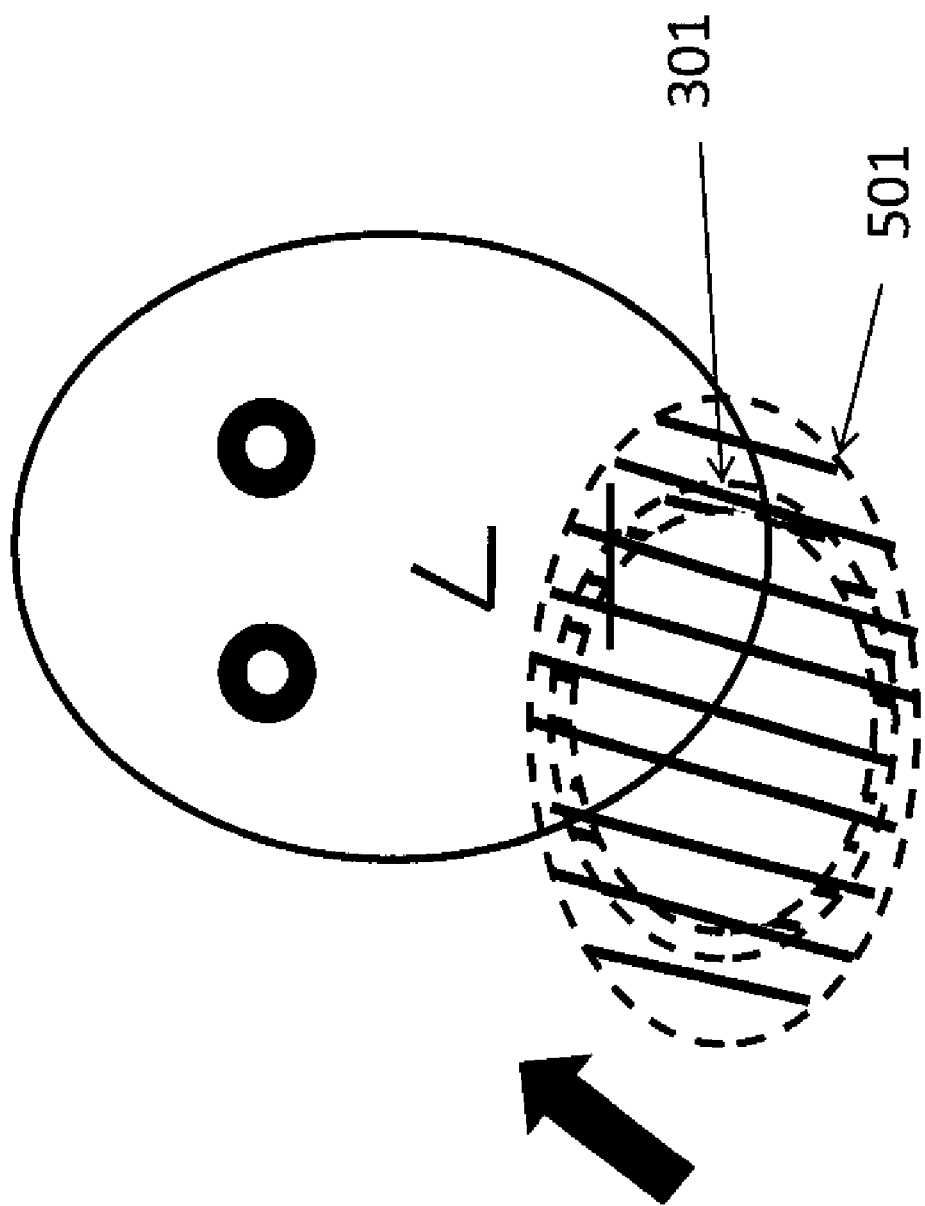
FIG. 14 shows the visible and infra-red illumination in the embodiment indicated in FIG. 6, except the operator is pointing the iris recognition device to one side of the face of the subject and is beginning to re-point the device towards the face of the subject
Figure 15:
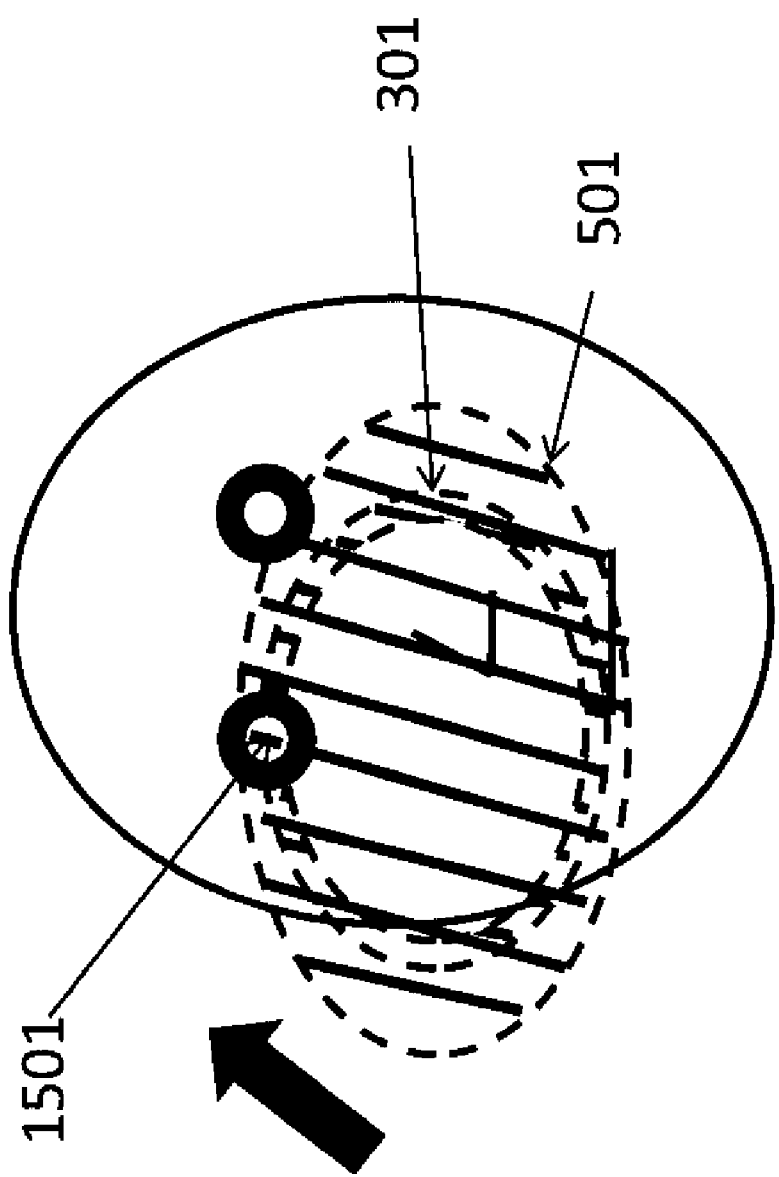
FIG. 15 shows the visible and infra-red illumination indicated in FIG. 14 at a later time instant, such that the visible illumination intersects the position of at least one of the eyes of the subject
Figure 16:
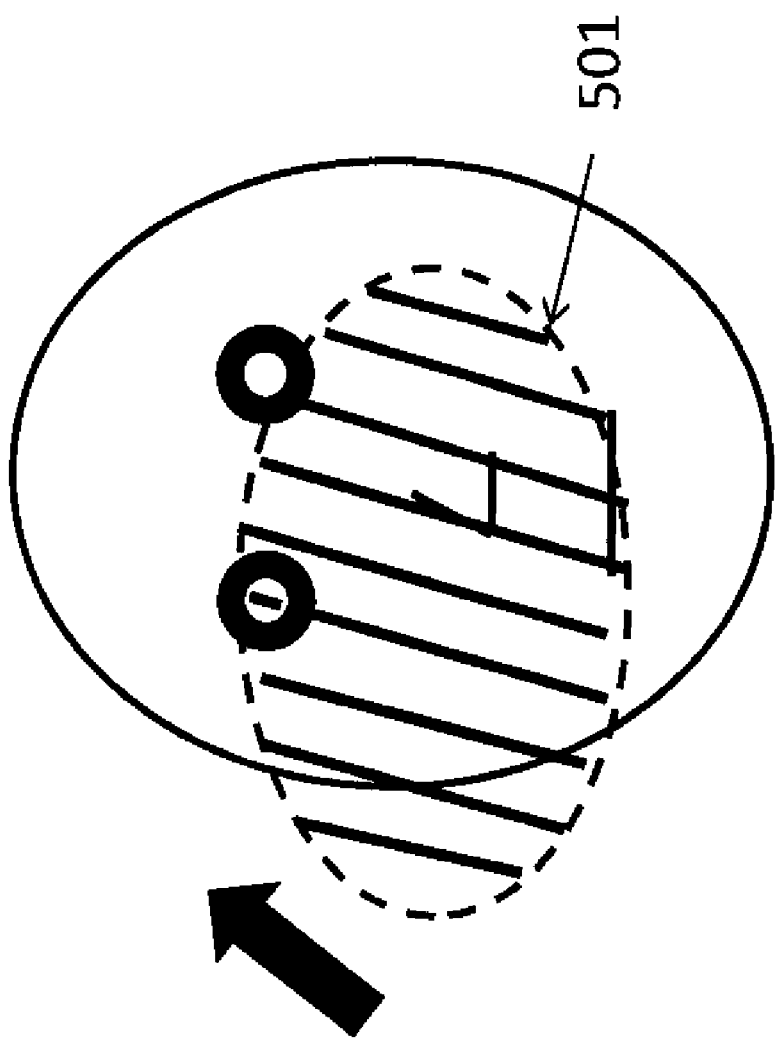
FIG. 16 shows the infra-red illumination indicated in FIG. 15 with the visible illumination turned off to avoid discomfort to the eyes of the subject

FIG. 14 shows both the visible illumination 301 and infra-red illumination 501 being projected from the device, before the operator has pointed the device successfully at the face of the subject. The infra-red illumination cannot be observed by the operator, and only the visible illumination is observed and used as feedback for the operator to re-position the device. FIG. 15 shows however that in the process of moving the device towards the correct location it is possible for the visible illumination to intersect 1501 the eye of the subject. This may cause discomfort to the subject for a brief moment. While this is typically a brief moment in time, the processor 1005 can optionally be used to detect whether eyes have been located within the area where the visible illumination is pointing at that moment in time, and direct the illumination controller 1006 to reduce the brightness of or turn-off the visible illumination momentarily as shown by the absence of the visible illumination in FIG. 16. The infra-red illumination 501 remains illuminated so that imagery continues to be captured and processed. When the processor 1005 no longer detects eyes within the area where the visible illumination is pointed, then the visible illumination can be turned on or increased in brightness once again.

The results of iris recognition or any other processing performed by processor 1005 can also be used to provide additional feedback to the operator. For example, if the subject is correctly identified by the iris recognition system, then the illumination controller can modify the visible illumination to change color (from red to green, for example) so that the result of the processing is made apparent to the operator.

Similarly, the audio controller can be directed to generate an audio signal that provides feedback to the operator without having to re-direct their gaze from the subject. The modification of the color of the visible illumination is implemented using LEDs of different colors projected onto the face, and controlled by the illumination controller. Results of intermediate processing, such as eye-finding, or any other processing responsive to the acquired imagery can also be used to modify the visible illumination or audio signal in order to further assist the operator to successfully use the face or iris recognition device. Though certain examples and advantages have been disclosed, further advantages and modifications may become obvious to one skilled in the art from the disclosures herein. The invention is therefore not to be limited except in the spirit of the claims that follow:

What is claimed is:

1. An apparatus for providing feedback to an operator of an iris recognition device, the apparatus comprising:
    a visible illuminator, projecting visible illumination to convey information to the operator of the iris recognition device such that the operator can position the iris recognition device to acquire an iris image without diverting the operator's gaze from a subject's face; and
    a controller for turning on the visible illumination if within a predetermined region around an eye region of the subject and turning off the visible illumination if deviating beyond the predetermined region, wherein the controller turns on or off the visible illumination based on detecting a location of the eye.

2. The apparatus of claim 1, further comprising an infra-red illuminator for illuminating the eye of the subject with infra-red illumination.

3. The apparatus of claim 2, wherein the visible illuminator is arranged so that the visible illuminator is substantially directed away from a region of the eye when the infra-red illuminator is illuminating the eye.

4. The apparatus of claim 3, wherein the visible illuminator illuminates a portion of the subject's face when the infra-red illuminator is illuminating the eye.

5. The apparatus of claim 3, wherein the visible illuminator is arranged to include an angle offset from the direction of the infra-red illuminator.

6. The apparatus of claim 3, wherein the visible illuminator and the infra-red illuminator are spatially separated with respect to one another in arrangement.

7. The apparatus of claim 3, wherein the visible illuminator is arranged so that the visible illumination is projected at a side of, or around the region of the eye.

8. The apparatus of claim 3, wherein the visible illuminator is arranged so that the visible illumination is projected at a side of, or around a region of the infra-red illumination.

9. The apparatus of claim 3, wherein the visible illuminator is arranged so that the visible illumination overlaps a portion of the infra-red illumination.

10. The apparatus of claim 3, wherein the visible illuminator is arranged so that the visible illumination does not overlap a portion of the infra-red illumination.

11. The apparatus of claim 1, further comprising a handle for an operator to adjust or operate the apparatus.

12. An apparatus for providing feedback to an operator of an iris recognition device, the apparatus comprising:
    an infra-red illuminator, illuminating an eye of a subject with infra-red illumination; and
    a visible illuminator, projecting visible illumination at a face region of the subject, to convey information to the operator of the device such that the operator can position the system to acquire an iris image without diverting the operator's gaze from the face of the subject, the visible illuminator comprising at least one illuminating element angled at around 3.6 degrees from the pointing direction of the iris recognition device, wherein the visible illuminator modifies the color of the visible illumination projected on the face responsive to a result of iris recognition performed on the acquired image.

13. The apparatus of claim 12, further comprising a handle for an operator to adjust or operate the apparatus.

14. The apparatus of claim 12, wherein the visible illuminator and the infra-red illuminator are spatially separated with respect to one another in arrangement.

15. An apparatus for providing feedback to an operator of an iris recognition device, the apparatus comprising:
  an infra-red illuminator, illuminating an eye of a subject with infra-red illumination; and
  a visible illuminator, projecting visible illumination at a face region of the subject, to convey information to the operator of the device such that the operator can position the system to acquire an iris image without diverting the operator's gaze from the face of the subject, the visible illuminator comprising at least one illuminating element angled at around 3.6 degrees from the pointing direction of the iris recognition device, wherein the visible illuminator modifies the color of the visible illumination projected on the face responsive to identification of the subject based on iris recognition performed on the acquired image.

16. The apparatus of claim 15, further comprising a handle for an operator to adjust or operate the apparatus.

17. The apparatus of claim 16, wherein the visible illuminator and the infra-red illuminator are spatially separated with respect to one another in arrangement.

18. An apparatus for providing feedback to an operator of an iris recognition device, the apparatus comprising:
  an infra-red illuminator, illuminating an eye of a subject with infra-red illumination; and
  a visible illuminator, projecting visible illumination at a face region of the subject, to convey information to the operator of the device such that the operator can position the system to acquire an iris image without diverting the operator's gaze from the face of the subject, the visible illuminator comprising at least one illuminating element angled at around 3.6 degrees from the pointing direction of the iris recognition device, wherein the visible illuminator reduces the brightness of the projected illumination or turns off the illumination, responsive to detecting that the visible illumination is projected at or near the eye region of the subject.

19. The apparatus of claim 18, further comprising a handle for an operator to adjust or operate the apparatus.

20. The apparatus of claim 18, wherein the visible illuminator and the infra-red illuminator are spatially separated with respect to one another in arrangement.

\* \* \* \* \*